United States Patent [19]  [11] 3,920,752
Lamparsky [45] Nov. 18, 1975

[54] NOVEL GAMMA, DELTA UNSATURATED ALDEHYDES
[75] Inventor: Dietmar Lamparsky, Wangen-Dubendorf, Switzerland
[73] Assignee: Givaudan Corporation, Clifton, N.J.
[22] Filed: Apr. 16, 1970
[21] Appl. No.: 29,258

[30] Foreign Application Priority Data
Apr. 26, 1969 Switzerland............... 6405/69

[52] U.S. Cl............................ 260/601 R
[51] Int. Cl.² ....................... C07C 47/20
[58] Field of Search ................ 260/601 R

[56] References Cited
FOREIGN PATENTS OR APPLICATIONS
2,000,344  9/1969  France............ 360/604 HF
634,738    7/1962  Belgium........... 260/601 R OTHER PUBLICATIONS
Cresson, P., Bull. Soc. Chim. France, 1964, pp. 2618–2628.
Marbet et al., Helv. Chim. Acta, Vol. 50, pp. 2095–2100, 1967.
Eschenmoser, A., Chemical Abstracts, Vol. 70, pg. 380, Item No. 88108v, 1969.

Primary Examiner—James O. Thomas, Jr.
Assistant Examiner—R. H. Liles
Attorney, Agent, or Firm—Thomas Cifelli, Jr.

[57] ABSTRACT

There are provided novel gamma, delta-unsaturated aldehydes of the general formula:

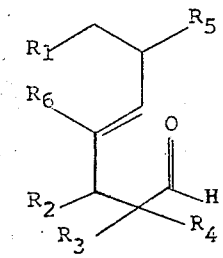

wherein $R_1$ is alkyl of 1–9 carbon atoms or alkenyl of 2–9 carbon atoms, $R_2$ and $R_3$ are hydrogen or alkyl of 1–6 carbon atoms, $R_4$ is hydrogen, alkyl of 1–6 carbon atoms or alkenyl of 2–6 carbon atoms, and $R_5$ and $R_6$ are hydrogen or methyl.

These novel compounds possess a floral or fruity aroma. There are also provided novel processes for preparing said compounds.

2 Claims, No Drawings

NOVEL GAMMA, DELTA UNSATURATED ALDEHYDES

RELATED APPLICATIONS

This application claims priority from Swiss patent application Ser. No. 6405/69 filed Apr. 26, 1969.

BACKGROUND OF THE INVENTION

1. Field of the Invention

The invention concerns novel aldehydic odorants

2. Description of the Prior Art

4-Heptenal is known to be useful as a flavorant for butter. The preparation of 2,2-dimethyl-4-heptenal has been disclosed (Brannock, *J.A.C.S.* 81, 3379 (1959)), however no utility for the compound has been stated and no odorant characteristics are suggested.

SUMMARY OF THE INVENTION

The novel $\gamma,\delta$-unsaturated aldehydes of the present invention have the following general formula (I):

(I) — structure with substituents $R_1$, $R_2$, $R_3$, $R_4$, $R_5$, $R_6$ on a hept-4-en-1-al skeleton with CHO group.

wherein $R_1$ is alkyl of 1–9 carbon atoms or alkenyl of 2–9 carbon atoms, $R_2$ and $R_3$ are hydrogen or alkyl of 1–6 carbon atoms, $R_4$ is hydrogen, alkyl of 1–6 carbon atoms or alkenyl of 2–6 carbon atoms and $R_5$ and $R_6$ are hydrogen or methyl. These compounds possess utility as odorants having a floral or fruity odor, or flavorants having a fruity taste. While the aroma of these compounds is not limited thereto, a citrus character predominates.

The compounds of formula (I) are produced by reacting a secondary allyl alcohol or general formula, (II)

(II) — structure with substituents $R_1$, $R_2$, $R_5$, $R_6$ and OH group.

in the presence of an acidic catalyst, with an aldehyde enol ether (IIIa) of the corresponding acetal (IIIb)

(IIIa) — structure with OR, $R_3$, $R_4$
(IIIb) — structure with OR, OR', $R_3$, $R_4$ wherein $R_1$ and $R_2$–$R_6$ are as above and R and R' are alkyl of 1–4 carbon atoms.

If desired, the reaction can take place in a solvent, at elevated temperatures, or under pressure or subject to a combination thereof.

DESCRIPTION OF THE PREFERRED EMBODIMENTS

The compounds of the present invention are odorants and flavorants of general Formula (I.)

The substituents on the hept-4-en-1-al skeleton are hydrogen, alkyl or alkenyl, and they may be the same or different, branched chain or straight chain.

In the starting materials (II, IIIa, and IIIb) and the final product (I), $R_1$ is alkyl or, alkenyl, for example methyl, ethyl, n-propyl, iso-propyl, n-butyl, sec-butyl, iso-butyl, pentyl, hexyl, heptyl, octyl, nonyl, vinyl, allyl, butenyl, such as 1-butenyl or 3-butenyl, 3-methyl-butenyl, pentenyl, hexenyl such as 1-hexenyl or 2-hexenyl, heptenyl or the like. $R_2$ and $R_3$ are hydrogen or alkyl having the same values as $R_1$ up to 6 carbon atoms, $R_4$ is hydrogen, alkyl or alkenyl having the same values as $R_1$ up to 6 carbon atoms, and $R_5$ and $R_6$ are hydrogen or methyl.

The compounds of the present invention are prepared by condensing an allyl alcohol of general formula (II) with an aldehyde enol ether (IIIa), or the corresponding acetal (IIIb) in the presence of an acidic catalyst.

In the starting materials (IIIa) and (IIIb), R and R' are alkyl of 1–4 carbon atoms, and they may be the same or different, branched chain or straight chain. As examples of these groups may be mentioned methyl, ethyl, n-propyl, iso-propyl, n-butyl, sec-butyl, or iso-butyl.

The allyl alcohols of the formula (II) which are especially preferred as starting materials include 1-hexen-3-ol 1-hepten-3-ol, 1-octen-3-ol, 1-decen-3-ol, 1-dodecen-3-ol, 1-penta-decen-3-ol, 2-octen-4-ol, 2-nonen-4-ol, 7-methyl-1-octen-3-ol, 4-methyl-1-hexen-3-ol, 8-methyl-1,7-nonadien-3-ol, 4,8-dimethyl-1,7-nonadien-3-ol, 6-methyl-1-hepten-3-ol, and 1-tetradecen-3-ol.

Among the enol ethers of formula (IIIa) which may be employed in the reaction are, for example, the following substances: vinyl methyl ether, vinyl ethyl ether, propen-1-yl ethyl ether, 2-methylpropen-1-yl ethyl ether.

Useful as the acetals of formula (IIIb) are, for example: acetaldehyde diethyl acetal, propionaldehyde diethyl acetal, propionaldehyde dimethyl acetal, isobutyraldehyde diethyl acetal, 5-methyl-4-hexenyl diethyl acetal and oenanth-aldehyde acetal.

The catalyst employed may be an organic or inorganic acid. In the former category, oxalic acid, trichloracetic acid, and p-toluene sulfonic acid may be especially mentioned. The last of these is particularly preferred. As inorganic acids there may be mentioned mineral acids such as phosphoric or sulfuric acids.

In carrying out the process of the present invention, it is preferred to react the active starting materials, in the absence of a solvent, although the reaction may also be carried out in the presence of solvents. The desirable solvents are reaction inert solvents, suitably hydrocarbon solvents such as hexane, cyclo-hexane, isooctane, benzene, toluene, petroleum ether, ligroin and the like.

The quantity of solvent used is not critical.

As noted above, two types of reactants may be employed with the allyl alcohol (II), namely, enol ethers (IIIa) and acetals (IIIb).

In the modification utilizing the enol ether (IIIa) there are charged between 2 and 3 moles of enol ether (IIIa) per mole of allyl alcohol (II). The use of this enol starting material gives rise to the desired γ,δ-unsaturated aldehyde (I) as well as a reusable by-product as shown below:

spheric pressure are of course longer, suitably between about 4 and about 8 hours. The exact time depending on whether the enol ether (IIIa) or the acetal (IIIb) are used as starting material.

The given reaction times are intended solely as general guides. It has been found most useful to run test

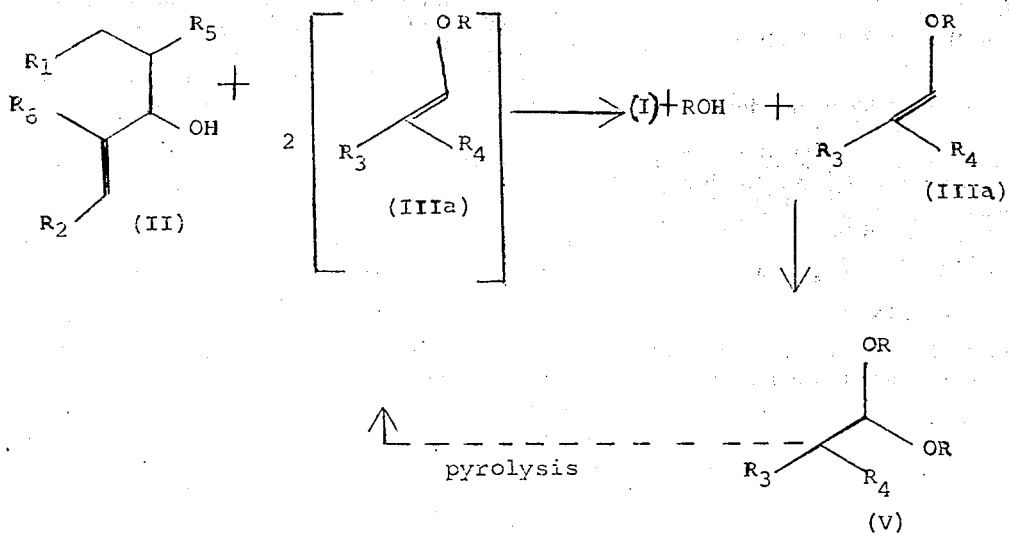

It will be seen that the by-product, acetal (V), is substantially similar to acetal (IIIb). It may thus be used in the manner of acetal (IIIb) described below, or it may be reconverted to enol ether (IIIa) by cleavage of the elements of the alcohol ROH, suitably by pyrolysis or other means well known to those skilled in the art.

In the second modification of the process there are used between 0.5 and 1 moles of acetal (IIIb) per mole of allyl alcohol (II). In this modification it has been found most helpful to remove the alcohol formed from the reaction mixture by continuous distillation, suitably by means of an advantageously arranged fractionation column.

In both of the above modifications there are utilized between 0.01 and 0.1, preferably between 0.02 and 0.05% by weight of acid catalyst based on the charged reactants.

The reaction is carried out by mixing the reactants and catalyst and causing them to react at elevated temperatures and, desirably at elevated pressures.

The reaction should be carried out at temperatures above 50°C, preferably above 100°C, most preferably at between 120° and 250°C.

Where the reaction is to be carried out at atmospheric pressure, one of the above named solvents may be used. The reactants may be heated under reflux with or without the presence of solvent.

It has been found most convenient to carry out the reaction under pressure in an autoclave. The pressure may be generated by the surcharge of an inert gas, for example, nitrogen or the like. The operating pressure is not critical; initial surcharges of from 1–10 atmospheres, suitably about 5 atmospheres have been found desirable. An initial pressure of 5 atmospheres will rise to about 11–14 atmospheres at about 180°C (internal reaction-vessel temperature) and will fall to between about 9–12 atmospheres on completion of the reaction at the same temperature.

Reaction times, using the autoclave method, are of the order of up to 3 hours, usually about 2 hours, after an initial warmup time of about 30 minutes, to reach the operating temperature. Reaction times at atmobatches and to follow the composition of the reaction mixture by gas chromatographic analysis in order to determine the optimal reaction time for a given combination of reactants and catalysts.

It will be apparent from the foregoing discussion that the autoclave method is relatively fast and simple. However, it does not readily lend itself to fractional separation during the course of the reaction. Such separation is important for the maintenance of a proper reaction equilibrium where the acetal (IIIb) is employed. While use of the acetal (IIIb) is within the scope of the invention, productivity considerations thus weigh heavily in favor of the use of the enol ether (IIIa).

In addition to the batch processes mentioned above, the process of the present invention may be carried out continuously. In this modification the reaction mixture is passed through a tube heated to elevated temperatures and kept under pressure.

It is advisable to determine the optimal reaction conditions for each reaction mixture within the range of the parameters.

After completion of the reaction by any of the previously described embodiments, the reaction product (I) is separated, suitably by fractional distillation of the reaction product. Prior to the distillation step, it is advantageous to neutralize the acid catalyst. This neutralization is achieved by adding a small amount of an organic or inorganic base to the reaction mixture. Bases such as sodium acetate, sodium hydroxide, sodium carbonate, ammonia, and tertiary amines such as triethylamine or pyridine may be employed. The base may be added directly to the reaction mixture, which is then washed with water to substantial neutrality, dried and then distilled.

The compounds of the present invention possess a variety of floral, fruity or "green-odor" characteristics. The citrus note predominates but not to the exclusion of other odors which include pine, apple, geranium, carrot, celery and cinnamon odors, of especial interest is a compound having a melon-type aroma.

Certain of the novel compounds of the present invention are of especial interest. Among these interesting compounds may be mentioned: 4-decenal which has a strong orange character coupled with a flowery, lily of the valley with lilac odorant note; 2-methyl-4-decenal, 3-methyl-4-decenal and 8-methyl-4-nonenal similarly have a fruity character with a citrus note, while 2,6-dimethyl-4-octenal is of consequence due to its melon note.

It is to be understood that the compounds named herein include all optical and conformational isomers includable under the terminology utilized.

In the following Examples, the temperatures are stated in degrees centigrade.

EXAMPLE 1

4-Decenal

1-Octen-3-ol (44g) and 15 mg of p-toluenesulphonic acid are treated with 74 g of vinyl ethyl ether at 0°. The reaction mixture is stirred at room temperature for 30 minutes and then transferred into a suitable pressure vessel.

Nitrogen at 5 kg/cm² is charged to the autoclave which is heated to 180° internal temperature (bath temperature 220°) within 30 minutes. In so doing, the pressure rises to 11 to 12 atmospheres, but then, with constant internal temperature, falls to ca 9 atmospheres. The said internal temperature is maintained for 80 minutes. The autoclave is thereafter quenched, the reaction mixture neutralized with sodium carbonate, washed with water, dried and distilled.

4-Decenal (46g) is obtained; boiling point 94 to 95°/14 mm Hg, $N_D^{20}$ 1.4421 to 1.4432, purity ca 94%.

The aldehyde has a very strong odour which is reminiscent of citrus fruits especially oranges.

EXAMPLE 2

4-Dodecenal

1-Decen-3-ol (14.2g) is cooled to 0°, treated with stirring with 5 mg of p-toluenesulphonic acid and subsequently with 19.6 g of vinyl ether. The reaction mixture is stirred at room temperature for 30 minutes, then decanted into a pressure vessel and, under a nitrogen pressure of 5 kg/cm², placed in a pre-heated bath of 220°. After 20 minutes, the necessary internal temperature of 175°–180° is reached. This temperature is held for 90 minutes, and the pressure rises to ca 12 kg/cm², while the pressure falls to the value of 8 to 9 kg/cm².

After quenching the autoclave with ice-water, the reaction mixture is neutralized and worked up as in Example 1. There are obtained 10 g of 4-dodecenal of boiling point 74°/0.3 mm Hg, $n_D^{20}$ 1.4460.

This aldehyde has a fresh citrus odor.

EXAMPLE 3

4-Tetradecenal

1-Dodecen-3-ol (65.4g), 15 mg of p-toluenesulphonic acid and 76.4 g of vinyl ethyl ether are mixed together as in Example 1 and 2 and subsequently heated to an autoclave internal temperature of 180°, under an initial nitrogen charge at a pressure of 5 kg/cm², for 2 hours. After quenching the pressure vessel and working up the reaction mixture as in Examples 1 and 2, there are obtained 49 g of 4-tetradecenal of boiling point 123°/1 mm Hg. $n_D^{20}$ 1.4498. The odor of this aldehyde is reminiscent of fir-cones and fresh linen.

EXAMPLE 4

3-Methyl-4-Nonenal

2-Octen-4-ol (20.0g) is mixed with 7 mg of p-toluenesulphonic acid and 33.6 g of vinyl ethyl ether at 0° and heated to an autoclave internal temperature of 195°, under an initial nitrogen charge at a pressure of 5 kg/cm², for 2 hours as in the preceding Examples. After quenching and working up the reaction mixture as in Examples 1–3, there may be obtained 10 g of 3-methyl4-nonenal of boiling point 32°/0.02 mm Hg, $n_D^{20}$ 1.4387. The odor of this aldehyde is citrus-like and fruity (apple juice).

EXAMPLE 5

3-Methyl-4-Decenal

2-Nonen-4-ol, (38.3g) obtained from 1-bromopentane and crotonaldehyde by means of a Grignard reaction is mixed with 12 mg of p-toluenesulphonic acid and 58 g of vinyl ethyl ether as in Example 1. After transferring the mixture into a pressure vessel, 5 kg/cm² of nitrogen are charged thereto. The autoclave is then heated to an internal temperature of 190° within 20 minutes, whereby the pressure rises to 14 kg/cm². The temperature of 190° is maintained for 2 hours, then the autoclave is 190° is maintained for 2 hours, then the autoclave is quenched and after opening the autoclave the reaction mixture is neutralized washed, dried and distilled in accordance with the procedures of Examples 1 and 2. There are obtained 19.1 g of 3-methyl-4-decenal of boiling point 63°/0.05 mm Hg, $n_D^{20}$ 1.4419. This aldehyde has a fresh odour reminiscent of orange peel.

EXAMPLE 6

2-Methyl-4-Decenal

1-Octen-3-ol (44g), is stirred with 15 mg of p-toluenesulphonic acid and 86 g of propenyl ethyl ether at room temperature as in Example 1 and subsequently transferred into a pressure vessel. After charging nitrogen at a pressure of 5 kg/cm², the autoclave is heated to 195° within 15 minutes and then held at this temperature for 2 hours. The pressure rose to between 11 and 11.5 kg/cm². After working up as in the Examples 1 and 2 described hereinbefore, there are obtained 28.7 g of 2-methyl-4-decenal of boiling point 52°/0.07 mmHg, $n_D^{20}$ 1.4358.

The odour of this aldehyde is citrus-like and slightly soapy.

EXAMPLE 7

2,3-Dimethyl-4-Nonenal

2-Octen-4-ol (44g) is treated as described hereinbefore with 15 mg of p-toluenesulphonic acid and 86 g of propenyl ethyl ether, stirred and transferred to a pressure vessel after charging nitrogen, at 5 kg/cm², the autoclave is heated to 195° within 20 minutes. This temperature is maintained for 2 hours, whereby the pressure rises to from between 10 and 12 kg/cm², and falls to about 11.8 kg/cm² towards the end of the reaction. After working up as described in examples 1 and 2, there are obtained 41.5 g of 2,3-dimethyl-4-nonenal of boiling point 46°/0.5 mm Hg; $n_D^{20}$ 1.4404.

The odour of this aldehyde is reminiscent of freshly scraped carrots.

EXAMPLE 8

2,2-Dimethyl-4-Decenal

1-Octen-3-ol, (23 g) is treated with 70 mg of crystallized phosphoric acid, and 17 g of isobutyraldehyde diethyl acetal are added with stirring and the mixture is held at reflux for 4 hours under a nitrogen atmosphere. The reflux condenser is subsequently replaced by a suitable packed fractionating column and the heating of the reaction mixture in the nitrogen stream continued. In the course of 3 hours, ethyl alcohol distils off at an internal flask temperature rising from 98° to 180°. The reaction mixture is taken up in 100 ml of ether and, as described above, neutralized, washed, dried, freed from solvent. The crude product (22g) is fractionally distilled whereby initially ca 8 g of unreacted 1-octen-3-ol and subsequently ca 6 g of 2,2-dimethyl-4-decenal (boiling point 52°/0.1 mm Hg; $n_D^{20}$ 1.4393) pass over. A further 1.3 g of the said aldehyde are contained in the end-fraction distilling at 56°/0.1 mm Hg. The odor of this aldehyde is green, humus-like; background of aldehyde note, reminiscent of celery.

EXAMPLE 9

Numerous other γ,δ-unsaturated aldehydes may be prepared by the general processes of examples 1 and 2. Certain of these aldehydes are set forth in Table I below preceded by the enol ether (IIIa) or acetal (IIIb) and the allyl alcohol (II) utilized in their preparation.

EXAMPLE 10

Fruity, Green Composition with Woody Undertone

|  | Parts by weight |
|---|---|
| 4-Decenal 10% | 70 |
| γ-Undecalactone 1% | 20 |
| Orange oil Ital. | 50 |
| Lemon oil Ital. | 20 |
| Methanol | 20 |
| Undecylenealdehyde 10% | 20 |
| Benzyl acetate | 50 |
| Pine needle oil | 150 |
| Bornyl acetate liquid | 40 |
| Linalyl acetate | 50 |
| Hydroxycitronellal | 30 |
| Geraniol pure | 70 |
| Terpineol | 250 |
| Cedarwood oil Americ. | 50 |
| α-Methylionone | 50 |
| Heliotropin | 20 |
| Vanillin | 20 |
|  | 1000 |

EXAMPLE 11

Flowery Composition with Predominant Aldehydic Top Note

|  | Parts by weight |
|---|---|
| 4-Tetradecenal 10% | 70 |
| 3-Methyl-4-decenal 10% | 30 |
| Lauraldehyde 10% | 20 |
| Decylaldehyde 10% | 10 |

TABLE 1

| ENOL ETHER (IIIa) OR ACETAL (IIIb) | ALLYL ALCOHOL (II) | γ,δ-UNSATURATED ALDEHYDE (I) | bp°C | mmHg | $n_D^{20}$ | ODOR-FLAVOR |
|---|---|---|---|---|---|---|
| 1 1-propenyl ethyl ether | 1-decen-3-ol | 2-methyl-4-dodecenal | 91 | 0.4 | 1.4461 | green aldehydic |
| 2 1-propenyl ethyl ether | 1-hexen-3-ol | 2-methyl-4-octenal | 72 | 12 | 1.4345 | green fatty, when dilute, orange-like |
| 3 1-propenyl ethyl ether | 2-methyl-1-hexen-3-ol | 2,4-dimethyl-4-octenal | 85 | 12 | 1.4420 | waxy, light floral, green |
| 4 isobutyraldehyde diethyl acetal | 1-hexen-3-ol | 2,2-dimethyl-4-octenal | 37 | 0.2 | 1.4343 | green, fruity, light fatty |
| 5 vinyl ethyl ether | 5-nonen-4-ol | 3-propyl-4-octenal | 68 | 0.7 | 1.4473 | green, geranium-like, light animal note |
| 6 1-propenyl ethyl ether | 4-methyl-1-hexen-3-ol | 2,6-dimethyl-4-octenal | 77 | 13 | 1.4349 | fruity melon |
| 7 heptanal diethyl acetal | 1-hexon-3-ol | 2-pentyl-4-octenal | 75 | 0.15 | 1.4459 | fruity, mandarin orange peel-like |
| 8 vinyl ethyl ether | 6-methyl-1-hepten-3-ol | 8-methyl-4-nonenal | 42/4 | 0.5 | 1.4409 | fruity, aldehydic |
| 9 5-methyl-4-hexenal diethyl acetal | 4-methyl-1-hexen-3-ol | 2-(3'-methyl-2'-butenyl)-6 methyl-4-octenal | 125 | 0.2 | 1.4770 | herb, undertone of cinnamylester |
| 10 heptanal diethyl acetal | 1-hexen-3-ol | 2-pentyl-2-(2'-hexenyl)-4-octenal | 113 | 0.05 | 1.4640 | oily, flavorant for animal feeds |
| 11 isovaleraldehyde diethyl acetal | 2-hepten-4-ol | 2-iso-propyl-3-methyl-4-octenal | 55–57 | 0.05 | 1.4485 | fatty acid ester type odor, reminiscent of enanthic ether |
| 12 vinyl ethyl ether | 8-methyl-1,7-nonadien-3-ol | 10-methyl-4,9-undecadienal | 90–92 | 0.05 | 1.4651 | citrus fruit type odor, aldehydic |
| 13 6-methyl-5-heptenal diethyl acetal | 4-methyl-1-hexen-3-ol | 2-(4'-methyl-3'-pentenyl)-6-methyl-4-octenal | 105–107 | 0.1 | 1.4590 | green, flowery, reminiscent of acetophenone |
| 14 1-propenyl ethyl ether | 4,8-dimethyl-1,7-nonadien-3-ol | 2,6,10-trimethyl-4,9-undecadienal | 76 | 0.4 | 1.4667 | green, flowery, reminiscent of acetophenone or hydratropic aldehyde, but milder |

-continued

| | Parts by weight |
|---|---|
| Undecylenealdehyde 1% | 50 |
| Styrallyl acetate | 15 |
| Amyl salicylate | 15 |
| Bergamot oil Reggio | 20 |
| Mandarin oil | 20 |
| Orange oil Ital. | 20 |
| Citronellol | 50 |
| Phenylethyl alcohol | 50 |
| Hydroxycitronellal | 50 |
| Phenylethylmethylethylcarbinol | 100 |
| Jasmine blossom oil artificial | 150 |
| Ylang ylang oil | 20 |
| α-Ionone | 25 |
| α-Methylionone | 70 |
| Isoeugenol | 10 |
| Ethyllinalool | 45 |
| Sandalwood oil East Ind. | 30 |
| Vetiveryl acetate | 40 |
| Resinoid Olibanum | 20 |
| Pentadecanolide | 20 |
| Benzyl salicylate | 50 |
| | 1000 |

EXAMPLE 12

Floral Odorant Composition of Fresia Type Aroma

| | Parts by weight |
|---|---|
| 2,4-Dimethyl-4-octenal 10% in PSDE | 30 |
| Hydroxycitronellal | 300 |
| Phenylethylalcohol | 80 |
| Methyl jonon alpha | 70 |
| Rosewood oil (brazilian) | 80 |
| Ylang Ylang Oil Bourbon | 10 |
| 1,1,4,4-Tetramethyl-6-ethyl-7-acetyl-1,2,3,4,-tetrahydronaphthalene | 10 |
| Heliotropin | 20 |

-continued

| | Parts by weight |
|---|---|
| p-tert.Butyl-α-methylhydrocinnam-aldehyde | 50 |
| Linalylacetate | 120 |
| Geranyl acetate | 20 |
| Citronellol | 50 |
| Nonan-1,3-diol-monoacetate | 50 |
| Betanaphthyl ethyl ether | 20 |
| Indole | 5 |
| Anthranilic acid methyl ester | 5 |
| Petitgrain oil Paraguay | 10 |
| Cardamom oil | 30 |
| | 960 |

EXAMPLE 13

Eau De Cologne-Type Composition

| | Parts by weight |
|---|---|
| 8-Methyl-4-nonenal | 5 |
| Bergamot oil synthetic | 360 |
| Bergamot oil Reggio | 45 |
| Lemon oil Italian | 135 |
| Orange oil Californian | 190 |
| Petitgrain oil Paraguay | 90 |
| Methyl-betanaphthyl ketone cryst. | 10 |
| Cinnamic acid methyl ester | 10 |
| Resinoid Benzoe Siam | 10 |
| Lavender oil Mont Blanc | 35 |
| Rosmary oil | 15 |
| Anthranilic acid methylester (10% in PSDE) | 10 |
| Diethylenglycol monoethyl ether | 85 |
| | 1000 |

I claim:
1. 2-Methyl-4-decenal.
2. 4trans-Decenal.

* * * * *

UNITED STATES PATENT OFFICE
CERTIFICATE OF CORRECTION

Patent No. 3,920,752        Dated November 18, 1975

Inventor(s) Dietmar Lamparsky

It is certified that error appears in the above-identified patent and that said Letters Patent are hereby corrected as shown below:

Column 1, line 44, "alcohol or general formula" should read -- alcohol of general formula --.

Column 1, line 65, -- (IIIb) -- is omitted under the second structure.

Column 2, line 36, "1-hexen-3-ol 1-hepten" should read -- 1-hexen-3-ol, 1-hepten ---.

Column 3, line 2, "enol ether." should read -- enol ether --.

Signed and Sealed this twenty-ninth Day of June 1976

[SEAL]

Attest:

RUTH C. MASON
*Attesting Officer*

C. MARSHALL DANN
*Commissioner of Patents and Trademarks*